United States Patent [19]
Laurain et al.

[11] Patent Number: 6,102,467
[45] Date of Patent: *Aug. 15, 2000

[54] BACKLITE RETENTION SYSTEM FOR USE IN AN AUTOMOTIVE VEHICLE CONVERTIBLE ROOF

[75] Inventors: Steven G. Laurain, Riverview, Mich.; Michael T. Willard, E-S Lake Oswego, Oreg.

[73] Assignee: ASC Incorporated, Southgate, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,820

[22] Filed: Aug. 22, 1997

[51] Int. Cl.⁷ .................................................. B60J 1/18
[52] U.S. Cl. ............................................... 296/107.07
[58] Field of Search ................... 296/107.07, 107.06, 296/146.14, 145, 214

[56] References Cited

U.S. PATENT DOCUMENTS

| | | | |
|---|---|---|---|
| Re. 15,508 | 12/1922 | Nelson et al. | 296/145 |
| 151,904 | 6/1874 | Neider | 296/145 |
| 277,388 | 5/1883 | Watters | 296/145 |

(List continued on next page.)

FOREIGN PATENT DOCUMENTS

| | | | |
|---|---|---|---|
| 0 246 201 | 11/1987 | European Pat. Off. | |
| 0 284 931 | 10/1988 | European Pat. Off. | |
| 669585 | 3/1936 | Germany | 296/145 |
| 1 680 205 | 9/1971 | Germany | |
| 41 13 872 A1 | 10/1992 | Germany | |
| 42 39 777 C1 | 2/1994 | Germany | |
| 42 40 281 A1 | 4/1994 | Germany | |
| 43 20 492 A1 | 10/1994 | Germany | |
| 43 22 730 A1 | 1/1995 | Germany | |
| 44 12 283 C1 | 6/1995 | Germany | |
| 503371 | 4/1939 | United Kingdom | 296/145 |
| 656225 | 8/1951 | United Kingdom | |
| 951534 | 3/1964 | United Kingdom | |
| 1269612 | 4/1972 | United Kingdom | 296/214 |
| 2 116 917 | 10/1983 | United Kingdom | |
| 2 286 367 | 2/1995 | United Kingdom | |

OTHER PUBLICATIONS

ASC Drawing entitled "1990 Saab Convertible, Top Stack Assembly—Cover", W–63X0–4960–AXXX, Sheet No. 5, May 2, 1990.

ASC Drawing entitled "1990 Chrysler P-27 Convertible, Top Cover Assembly", W–39X0–4960–AXXX, Sheet No. 4F, May 15, 1990.

*Primary Examiner*—Dennis H. Pedder
*Attorney, Agent, or Firm*—Harness, Dickey & Pierce, P.L.C.

[57] ABSTRACT

A backlite retention system for use in an automotive vehicle convertible roof includes a pliable roof cover, a window, a carrier and a retainer. The retainer is secured to the carrier so as to firmly retain the roof cover to the window. In another aspect of the present invention, a garnish molding is fastened to the retainer.

20 Claims, 3 Drawing Sheets

U.S. PATENT DOCUMENTS

| | | | |
|---|---|---|---|
| 298,021 | 5/1884 | Parker | 296/145 |
| 1,337,302 | 4/1920 | Winans | 296/145 |
| 1,363,702 | 12/1928 | Winans | 296/145 |
| 1,364,460 | 1/1921 | Soss | 296/145 |
| 1,378,292 | 5/1921 | Stafford | 296/145 |
| 1,388,370 | 8/1921 | Peterson | 296/145 |
| 1,423,685 | 7/1922 | Schaaf | 296/145 |
| 1,446,986 | 2/1923 | Nelson | 296/145 |
| 1,452,612 | 4/1923 | McCloud | 296/145 |
| 1,469,229 | 10/1923 | McAvoy . | |
| 1,478,447 | 12/1923 | Maranville et al. . | |
| 1,501,702 | 7/1924 | Campbell | 296/145 |
| 1,501,703 | 7/1924 | Campbell | 296/145 |
| 1,504,954 | 8/1924 | Kamp . | |
| 1,566,912 | 12/1925 | Nelson | 296/145 |
| 1,568,138 | 1/1926 | Decker | 296/145 |
| 1,609,417 | 12/1926 | Morin . | |
| 1,671,059 | 5/1928 | Calpin . | |
| 1,671,061 | 5/1928 | Calpin . | |
| 1,723,466 | 8/1929 | Campbell . | |
| 1,745,148 | 1/1930 | Campbell . | |
| 1,961,352 | 6/1934 | Hall | 296/145 |
| 2,270,036 | 1/1942 | Conlon . | |
| 2,374,057 | 4/1945 | Watkins . | |
| 2,596,355 | 5/1952 | Ackermans . | |
| 2,632,670 | 3/1953 | Crenshaw . | |
| 2,708,137 | 5/1955 | Poelman . | |
| 2,738,379 | 5/1953 | Spring . | |
| 2,770,489 | 11/1956 | Garvey et al. . | |
| 2,798,763 | 7/1957 | Dujic . | |
| 2,947,570 | 8/1960 | Noe . | |
| 3,091,494 | 5/1963 | Cohen . | |
| 3,188,135 | 6/1965 | Bernstein et al. . | |
| 3,191,988 | 6/1965 | Sturtevant et al. | 296/214 |
| 3,191,989 | 6/1965 | McCornack . | |
| 3,214,213 | 10/1965 | Hezler, Jr. et al. . | |
| 3,388,945 | 6/1968 | Kevelin et al. . | |
| 3,536,354 | 10/1970 | Ingram . | |
| 3,635,519 | 1/1972 | Foster et al. | 296/214 X |
| 3,976,324 | 8/1976 | Lehmenn | 296/107.07 |
| 4,529,243 | 7/1985 | Kaltz et al. . | |
| 4,543,747 | 10/1985 | Kaltz et al. . | |
| 4,572,570 | 2/1986 | Trucco . | |
| 4,611,849 | 9/1986 | Trenkler . | |
| 4,626,020 | 12/1986 | Kaltz et al. . | |
| 4,626,021 | 12/1986 | Muscat . | |
| 4,778,215 | 10/1988 | Ramaciotti . | |
| 4,784,428 | 11/1988 | Moy et al. . | |
| 4,828,317 | 5/1989 | Muscat . | |
| 4,852,935 | 8/1989 | Varner . | |
| 4,883,940 | 11/1989 | Tokarz . | |
| 4,948,194 | 8/1990 | Dogliani . | |
| 5,061,332 | 10/1991 | Stolz et al. . | |
| 5,118,158 | 6/1992 | Truskolaski . | |
| 5,161,852 | 11/1992 | Alexander et al. . | |
| 5,195,798 | 3/1993 | Klein et al. . | |
| 5,267,770 | 12/1993 | Orth et al. . | |
| 5,271,655 | 12/1993 | Ball et al. . | |
| 5,299,850 | 4/1994 | Kaneko et al. . | |
| 5,320,400 | 6/1994 | Orth et al. . | |
| 5,325,807 | 7/1994 | Hidekura . | |
| 5,375,901 | 12/1994 | Agosta et al. . | |
| 5,445,429 | 8/1995 | Koehler et al. . | |
| 5,454,615 | 10/1995 | Schnepf . | |
| 5,456,516 | 10/1995 | Alexander et al. . | |
| 5,460,424 | 10/1995 | Wagner . | |
| 5,540,476 | 7/1996 | Cowsert . | |
| 5,558,390 | 9/1996 | Hemmis et al. . | |
| 5,600,922 | 2/1997 | Stolz . | |
| 5,601,329 | 2/1997 | Glagow et al. . | |

BACKLITE RETENTION SYSTEM FOR USE IN AN AUTOMOTIVE VEHICLE CONVERTIBLE ROOF

BACKGROUND AND SUMMARY OF THE INVENTION

This invention relates generally to automotive vehicles and more particularly to a window retention system for use in an automotive vehicle convertible roof.

Soft-top convertible roofs in automotive vehicles have commonly employed flexible, polyvinyl chloride back windows, which are also known as backlites. Such flexible backlites are relatively inexpensive, lightweight and easy to stow as compared to rigid, glass windows. Furthermore, flexible, polymeric backlites are usually sewn, adhesively bonded or dielectrically bonded to the pliable roof cover. Some backlites are also removably attached to the roof cover by way of zippers or the like which are sewn to the roof cover and backlite. For example, reference should be made to U.S. Pat. No. : 5,540,476 entitled "Convertible Top Covering Retainer with Method for Using the Same" which issued to Cowsert on Jul. 30, 1996; U.S. Pat. No. 5,511,844 entitled "Convertible Top having Slidably Replaceable Bow" which issued to Boardman on Apr. 30, 1996; U.S. Pat. No. 5,271,655 entitled "Window Which can be Fastened in a Folding Top by Means of a Zipper, and a Process for Exchanging a Surface Section" which issued to Ball et al. on Dec. 21, 1993; and U.S. Pat. No. 4,611,849 entitled "Convertible Top with Interchangeable Flexible and Rigid Rear Windows for a Passenger Motor Vehicle" which issued to Trenkler on Sep. 16, 1986.

Some conventional convertible roofs use glass backlites to overcome the ultraviolet light degradation and wrinkling problems often associated with flexible backlites. Glass backlites further offer superior optical transparency, free of distortions and color shifting. However, glass backlites are difficult to fasten to soft-top roofs. Usually, glass backlites are adhesively bonded to the pliable cover. Examples of rigid, glass backlites are disclosed in U.S. Pat. No. 5,593,202 entitled "Convertible Top" which issued to Corder et al. on Jan. 14, 1997, and U.S. Pat. No. 5,375,901 entitled "Convertible Top with Fold-Down Rear Window" which issued to Agosta et al. on Dec. 27, 1994.

In accordance with the present invention, the preferred embodiment of a backlite retention system for use in an automotive vehicle convertible roof includes a pliable roof cover, a window, a carrier and a retainer. The retainer is secured to the carrier so as to firmly retain the roof cover to the window in a durable and leakproof manner. In another aspect of the present invention, a seal is also trapped between the roof cover and the window. In a further aspect of the present invention, the window is a rigid, glass backlite. In still another aspect of the present invention, a garnish molding is fastened to the retainer. Another aspect of the backlite retention system of the present invention provides a means for securing a headliner covering material between a garnish molding and a backlite.

The backlite retention system of the present invention is advantageous over conventional devices in that the present invention is robust, durable, leak-free and has a thin cross sectional profile. Furthermore, the present invention is easy to assemble and repair with common tools, such as a screw driver. The retainer is configured with a self-locating channel that also generally prevents its rotation relative to the carrier. Thus, the present invention can be quickly and inexpensively assembled and is adapted for receiving easy to assemble garnish molding or headliner options without any revisions to the retainer. Additional advantages and features of the present invention will become apparent from the following description and appended claims, taken in conjunction with the accompanying drawings.

DETAILED DESCRIPTION OF THE PREFERRED EMBODIMENT

Figure 6:
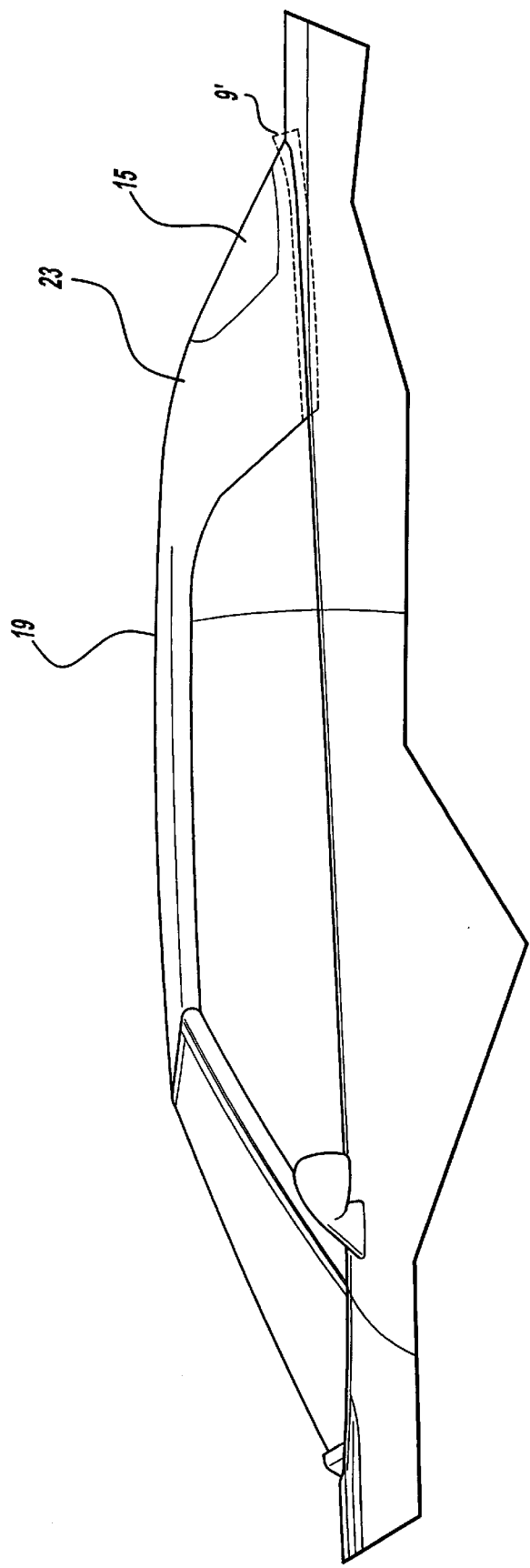
FIG. 6 is a diagrammatic side view showing an automotive vehicle convertible roof employing the preferred embodiment of the backlite retention system.

The preferred embodiment of a backlite retention system of the present invention is employed to retain a rigid, glass window to a convertible roof 9 (see FIG. 6). The convertible roof is movable from a raised or extended position covering a passenger compartment of an automotive vehicle to a retracted or folded position 9' in a boot or storage compartment of the vehicle. The boot is preferably located between the passenger compartment and a trunk. The convertible roof consists of a pliable roof cover, made from canvas, vinyl or polyester fiber, which spans between and is fastened to four collapsible roof bows. The number one bow is operably latched to a front header panel of the vehicle body when in a raised position. The rear edge of the roof cover is secured to the vehicle's body in the boot, or can alternately be attached to a movable five bow.

Figure 1:
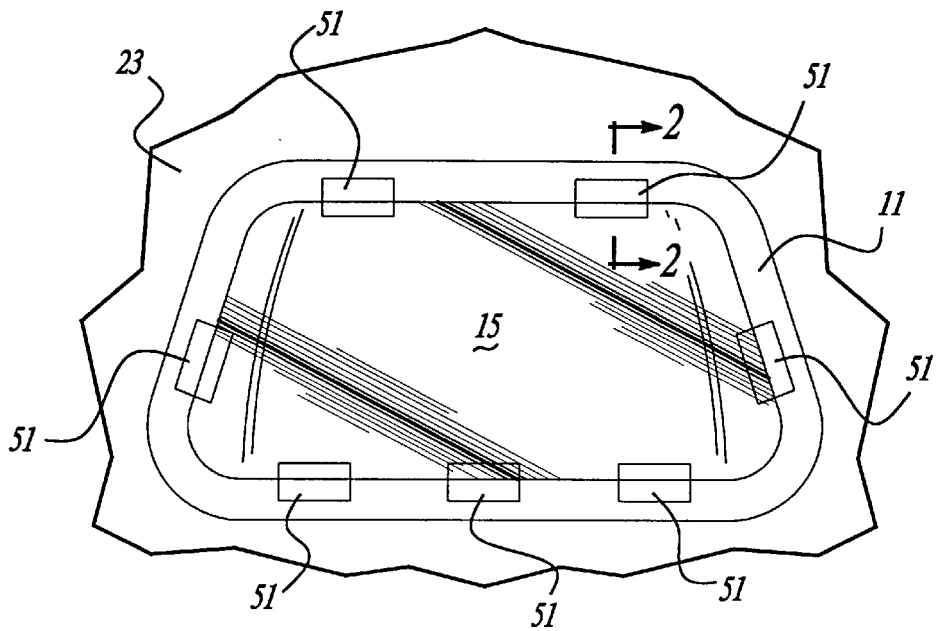
FIG. 1 is a diagrammatic rear elevational view showing the preferred embodiment of a backlite retention system of the present invention.
Figure 2:
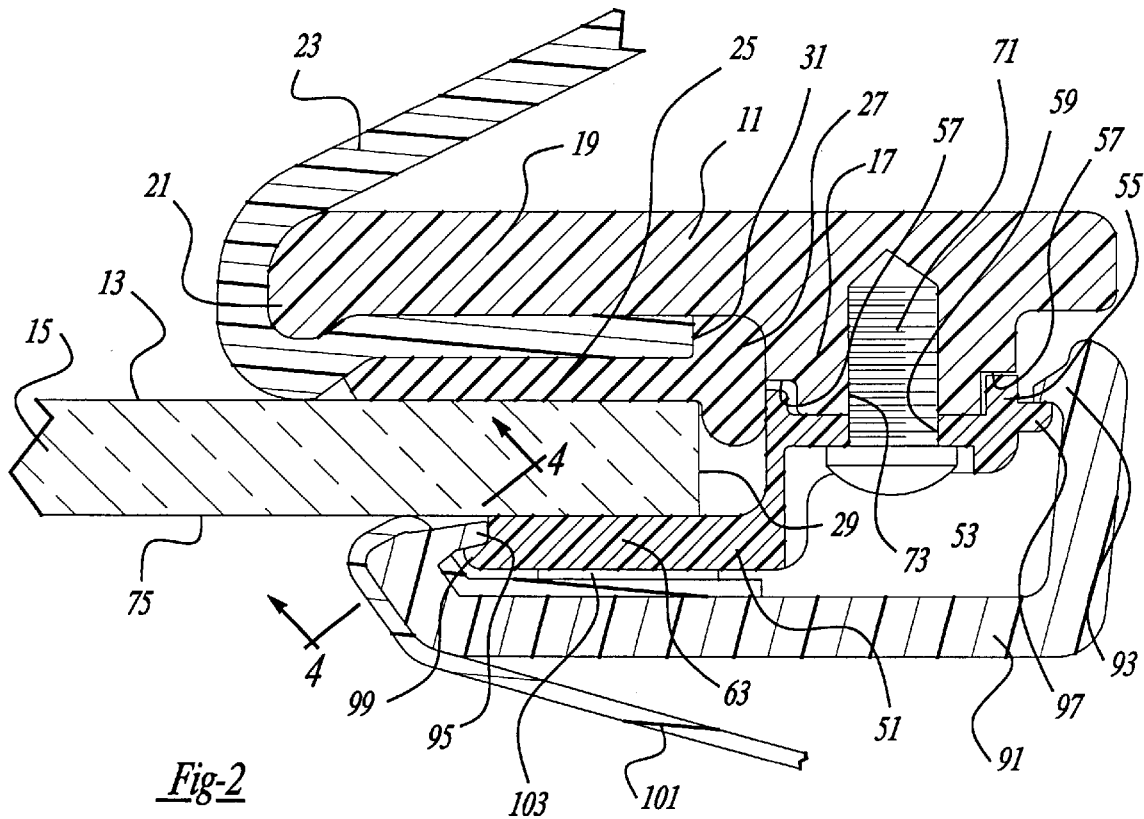
FIG. 2 is a cross sectional view, taken along line 2—2 of FIG. 1, showing the preferred embodiment of the backlite retention system.
Figure 3:
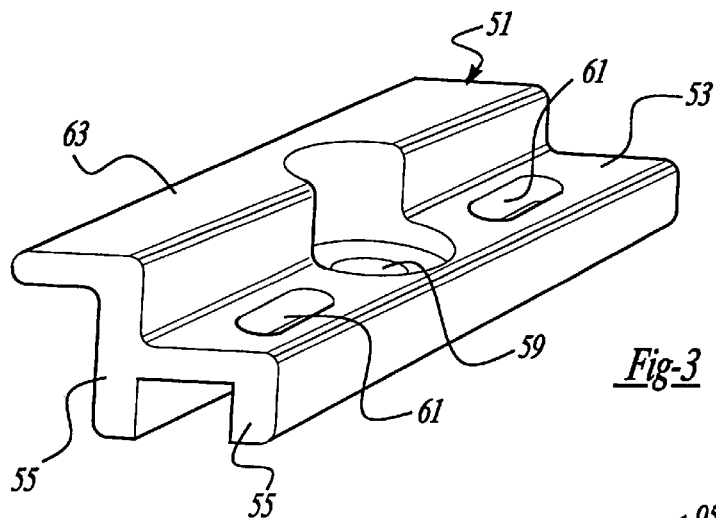
FIG. 3 is a perspective view showing a retainer employed in the preferred embodiment of the backlite retention system.

Referring to FIGS. 1–3, an elongated carrier 11 is disposed adjacent to an outside surface 13 of a backlite 15. Carrier 11 has a body section 17 and a generally flat arm section 19 with a rounded end 21. Carrier 11 is either extruded from aluminum or is injection molded from an engineering grade polymeric material. Backlite 15 preferably has a three-dimensionally curved shape to correspond with that of the convertible roof.

A portion of roof cover 23 is wrapped around end 21 while being pinched against backlite 15 and a generally flat portion of a seal 25. Seal 25 is made from either a closed cell foam, Nitrile or foam-EPDM material. Seal 25 has an enlarged solid head 27 disposed adjacent to a periphery 29 of backlite 15 and a window opening edge 31 of roof cover 23. Seal 25 has a uniform cross sectional shape along its length.

Seven injection molded, polymeric or extruded metal (e.g., aluminum) retainers 51 are locally spaced from each other around periphery 29 of backlite 15. Each retainer 51 has a channel segment 53 defined by a pair of legs 55 which interface with corresponding backside depressions 57 in carrier 11. A single hole 59 and a pair of elongated slots 61 are provided in channel 53 of each retainer 51. A generally flat arm 63 projects from channel 53 in an offset and stepped manner. Accordingly, retainer 51 is securely fastened to carrier 11 when a single threaded screw 71 is inserted through hole 59 for engagement in a corresponding internally threaded bore 73 in carrier 11. This causes arm 63 of each retainer 51 to abut against an inside surface 75 of backlite 15. Hence, roof cover 23, seal 25 and backlite 15 are compressed or trapped between each retainer 51 and carrier 11, thereby retaining backlite 15 to the convertible roof. It may also be necessary to employ a film adhesive between the roof cover and carrier for supplemental retention.

Figure 4:
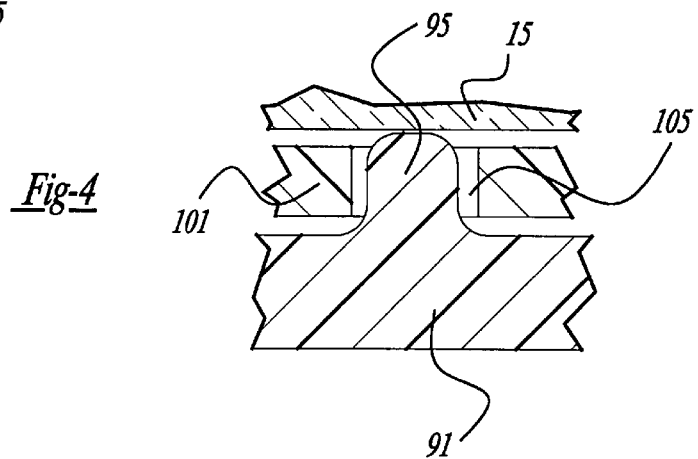
FIG. 4 is a fragmentary cross sectional view, taken along line 4—4 of FIG. 2, showing a headliner covering material and the retainer employed in the preferred embodiment of the backlite retention system.

As can be observed in FIGS. 2 and 4, an optional garnish molding 91 is snapped onto each retainer 51 by way of snap-fit barbs or fingers 93 and 95 engaging with undercut ledges 97 and 99. Garnish molding is preferably injection molded from high temperature resistant ABS or from a roll formed metal. An optional headliner covering material 101, such as fabric or vinyl, is wrapped around an end of garnish molding 91 while being trapped between garnish molding 91 and retainer 51 and/or backlite 15. A film or pressure sensitive adhesive 103 can be employed to supplementally or alternately secure either headliner covering material 101 or garnish molding 91 to each retainer 51. A set of fingers 95 are further received within a corresponding set of holes 105 of headliner covering material 101 whereby garnish molding 91 secures the headliner covering material to backlite 15 and convertible roof cover 23.

Each localized retainer 51 is quickly and easily assembled to the carrier by a single screw. Meanwhile, the interfacing channels and depressions generally deter rotation, and the channels serve to locate the retainers relative to the carrier. Garnish molding 91 can be removed from retainers 51 and retainers 51 can be unscrewed from carrier 11 by use of a common screwdriver. Thus, the present invention is superior to traditionally complicated and destructive backlite installation and removal procedures.

Figure 5:
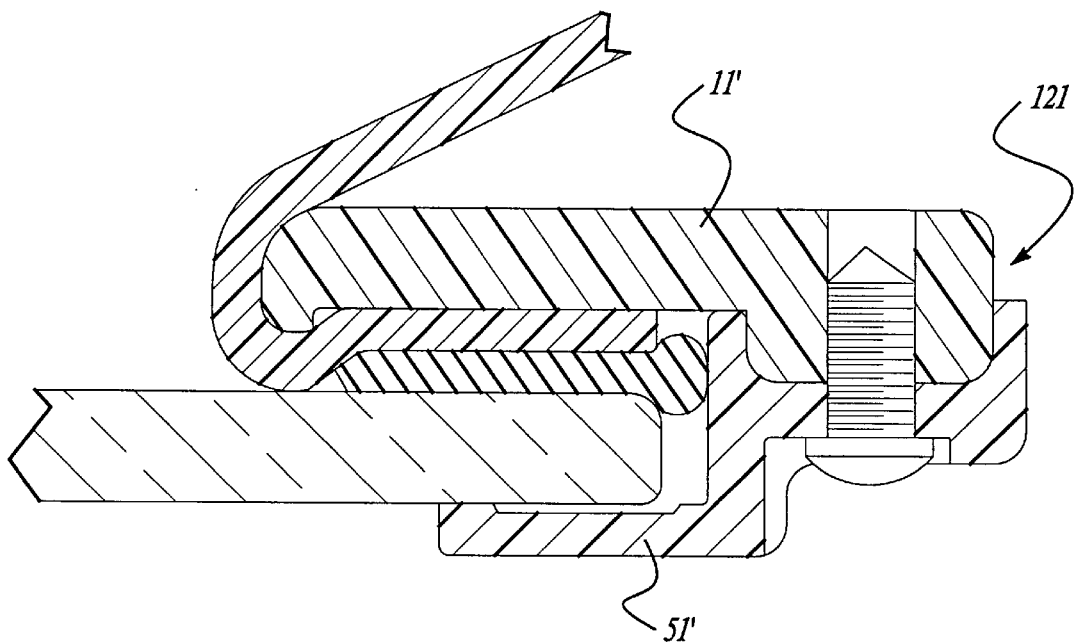
FIG. 5 is a cross sectional view, similar to that of FIG. 2, showing an alternate embodiment of the backlite retention system.

An alternate embodiment of the backlite retention system is illustrated in FIG. 5. This embodiment is similar to the preferred embodiment except that with the present embodiment, the shapes of a carrier 11' and a retainer 51' are slightly altered. For example, an interfacing structure 121 does not employ depressions in carrier 11. It should also be appreciated that the specific interfacing structure may be reversed between the carrier and retainers. Furthermore, the alternate embodiment backlite retention system does not provide for headliner or garnish molding attachment.

While various embodiments of the backlite retention system have been disclosed, it should be appreciated that other aspects can be employed within the scope of the present invention. For example, a greater or fewer number of retainers can be used with a single or multiple carriers. Also, a garnish molding can be secured to a retainer by a screw. Additionally, quarter windows or stationary sunroof windows may be affixed to a soft-top roof in the manner disclosed herein. The present invention retention system is also adaptable to secure a flexible window to a convertible roof. Various materials have been disclosed in an exemplary fashion, however, other materials may of course be employed. It is intended by the following claims to cover these and any other departures from the disclosed embodiments which fall within the true spirit of this invention.

The invention claimed is:

1. A window retention system for use in an automotive vehicle convertible roof, said system comprising:

a pliable roof cover movable from a raised position to a retracted position;

a window having a peripheral edge;

a plastic carrier located adjacent an outside of said window, said roof cover having a portion being located between said carrier and said window;

a plastic retainer located adjacent an inside of said window, said retainer having a channel and a substantially flat arm projecting from said channel in an offset and stepped manner, a fastener attaching said retainer to said carrier external to said edge of said window, said window being secured to said roof cover by at least said carrier, said retainer and said fastener;

said window being removable from said roof cover while allowing said window and said roof cover to remain intact; and said pliable roof cover being imperforate adjacent said window and substantially overlapping said window between said carrier and said retainer.

2. The system of claim 1 further comprising a garnish molding secured to said retainer adjacent said inside of said window, said garnish molding hiding at least a portion of said fastener from view.

3. The system of claim 2 wherein said garnish molding is snapped onto said retainer.

4. The system of claim 2 further comprising a headliner covering material located between a back side of said garnish molding and said retainer.

5. The system of claim 1 further comprising at least four of said retainers spaced from each other around a periphery of said window, said carrier being elongated substantially parallel to said periphery of said window for being secured to a plurality of said retainers.

6. The system of claim 5 wherein said fastener is threaded and includes an enlarged head.

7. The system of claim 1 further comprising an interfacing formation locating and aligning said retainer relative to said carrier.

8. The system of claim 1 wherein said retainer is injection molded from a polymeric material.

9. The system of claim 1 wherein said window is a rigid and three dimensionally curved glass backlite.

10. The system of claim 1 further comprising a seal disposed between said roof cover and said window, said portion of said roof cover and said seal being pinched between said carrier and said window.

11. A backlite retention system for use in an automotive vehicle, said system comprising:

a pliable roof cover having a backlite opening;

a rigid backlite having an outside, an inside and a peripheral edge;

at least one carrier located around said peripheral edge of said backlite adjacent said outside of said backlite;

a seal located adjacent said peripheral edge of said backlite and against said outside of said backlite, a portion of said roof cover adjacent said backlite opening being trapped between said seal and said carrier;

a set of retainers spaced from each other at locations around said peripheral edge of said backlite, said retainers and a portion of said roof cover contacting directly and removably against said backlite; and fasteners securing said retainers to said carriers thereby also securing said backlite to said roof cover.

12. The system of claim 11 wherein each of said retainers include:

an anti-rotational channel for engaging a corresponding formation of said carrier;

an arm extending from said channel in a stepped fashion, said arm being located against said backlite; and an inside surface defining a fastener receiving hole disposed through said channel.

13. The system of claim 11 wherein said backlite is made of imperforated glass and has a three-dimensionally curved shape.

14. A headliner and backlite retention system for use in an automotive vehicle, said system comprising:

a backlite having an outside and an inside;

a carrier located adjacent said outside of said backlite;

a retainer located adjacent said inside of said backlite;

a plastic garnish molding attached to at least one of said retainer and said carrier in a snap fit manner; and a headliner covering material having a section located between said garnish molding and said backlite.

15. The system of claim 14 further comprising a set of fingers projecting from said garnish molding substantially toward said retainer, said headliner covering material being secured to said garnish molding by said set of fingers.

16. The system of claim 15 wherein said set of fingers project through corresponding holes in said headliner covering material.

17. The system of claim 14 further comprising a pliable roof cover of a convertible roof being secured between said carrier and said backlite.

18. The system of claim 17 wherein said backlite is rigid and made from glass, and said fastener is threaded and has a head covered by said garnish molding.

19. The system of claim 14 further comprising an adhesive bonding said garnish molding to said retainer.

20. The system of claim 11 wherein said backlite is removable from said roof cover by detaching said fasteners.

* * * * *